(12) United States Patent
Malnati et al.

(10) Patent No.: US 8,688,488 B2
(45) Date of Patent: Apr. 1, 2014

(54) METHOD AND APPARATUS FOR THE PREDICTION OF ORDER TURNAROUND TIME IN AN INFORMATION VERIFICATION SYSTEM

(75) Inventors: Stefano Malnati, La Jolla, CA (US); Alexandr Svirin, Tallinn (EE); Aleksei Arekhin, Tallinn (EE); Vladislav Juri Gussev, Santa Ana, CA (US)

(73) Assignee: Hireright, Inc., Irvine, CA (US)

( * ) Notice: Subject to any disclaimer, the term of this patent is extended or adjusted under 35 U.S.C. 154(b) by 184 days.

(21) Appl. No.: 12/220,572

(22) Filed: Jul. 25, 2008

(65) Prior Publication Data
US 2011/0047113 A1 Feb. 24, 2011

(51) Int. Cl.
*G06Q 10/00* (2012.01)
*G06Q 99/00* (2006.01)

(52) U.S. Cl.
USPC ......... 705/7.11; 705/1.1; 705/7.12; 705/7.13; 705/7.15; 705/317

(58) Field of Classification Search
USPC .......... 705/22–28, 1.1, 7.11, 7.12, 7.13, 7.15, 705/317
See application file for complete search history.

(56) References Cited

U.S. PATENT DOCUMENTS

| | | | | |
|---|---|---|---|---|
| 6,151,582 A * | 11/2000 | Huang et al. | ................. | 705/7.25 |
| 7,295,990 B1 * | 11/2007 | Braumoeller et al. | ....... | 705/7.31 |
| 2002/0112195 A1 * | 8/2002 | Hathaway et al. | ................ | 714/4 |
| 2003/0105694 A1 * | 6/2003 | Conkwright et al. | .......... | 705/35 |
| 2003/0126103 A1 * | 7/2003 | Chen et al. | ..................... | 706/50 |
| 2004/0138932 A1 * | 7/2004 | Johnson et al. | ................... | 705/7 |
| 2004/0168080 A1 * | 8/2004 | Shapiro et al. | ............... | 713/200 |
| 2004/0186852 A1 * | 9/2004 | Rosen | ........................ | 707/104.1 |
| 2005/0288993 A1 * | 12/2005 | Weng et al. | ..................... | 705/10 |
| 2006/0008126 A1 * | 1/2006 | Holloran et al. | ............. | 382/124 |
| 2006/0224398 A1 * | 10/2006 | Lakshman et al. | ................ | 705/1 |
| 2007/0070379 A1 * | 3/2007 | Rai et al. | ...................... | 358/1.13 |
| 2007/0136705 A1 * | 6/2007 | Hosono | ............................ | 716/6 |
| 2008/0086341 A1 * | 4/2008 | Collipi et al. | ..................... | 705/7 |
| 2008/0255910 A1 * | 10/2008 | Bagchi et al. | ..................... | 705/8 |
| 2010/0228682 A1 * | 9/2010 | Ikeda et al. | .................. | 705/348 |

* cited by examiner

*Primary Examiner* — Ig T An
(74) *Attorney, Agent, or Firm* — Arnold & Porter LLP

(57) ABSTRACT

A method and apparatus for the prediction of order turnaround time in an information verification system is disclosed. An information verification order comprises several and diverse instances of different types of elementary verification/validation/search services. Each of these services is characterized by its own turnaround time (TAT) statistical distribution function which is used in the prediction of order turnaround time. A Monte Carlo algorithm is used to determine the order turnaround time.

25 Claims, 9 Drawing Sheets

---

ORDER TURNAROUND TIME PREDICTIVE REPORT
REQUEST #:WE-123-4567

HIRERIGHT, DNN
5151 CALIFORNIA
IRVINE, CA 92617
PHONE: (949) 428-5910
FAX: (949) 428-5805

HIRE RIGHT
HIRERIGHT, INC.
5151 CALIFORNIA
IRVINE, CA 92617
PHONE:866-521-6995, 949-428-5804
FAX: 877-797-3442, 949-224-6020
CUSTOMERSERVICE@HIRERIGHT.COM

DEAR CUSTOMER:

THANK YOU FOR ORDERING VERIFICATION SERVICES FROM HIRERIGHT
YOUR ORDER WE-123-4567 WAS SUCCESSFULLY SUBMITTED AND PROCESSING HAS BEGUN.
ACCORDING TO HISTORICAL DATA, THE MEAN TURNAROUND TIME (TAT) VALUES FOR THE INDIVIDUAL SERVICES IN THE GIVEN LOCATIONS ARE THE FOLLOWING:

| VERIFICATION | TAT |
|---|---|
| SS TRACE | 0,01 |
| CRIMINAL FELONY & MISDEMEANOR (PAST 7 YEARS HISTORY) LOCATION: NEW YORK, NEW YORK COUNTY, NY, USA | 2,1 |
| CIVIL UPPER & LOWER (PAST 7 YEARS HISTORY) LOCATION: NEW YORK, NEW YORK COUNTY, NY, USA | 1,8 |
| FEDERAL CRIMINAL (PAST 7 YEARS ) LOCATION: NEW YORK, NEW YORK COUNTY, NY, USA | 2,2 |
| FEDERAL BANKRUPTCY LOCATION: NEW YORK, NEW YORK COUNTY, NY, USA | 1,5 |
| EDUCATION LOCATION: BOSTON, MA, USA, NORTHEASTERN UNIVERSITY | 1,8 |
| EDUCATION LOCATION: DELHI, INDIA, UNIVERSITY OF DELHI | 3,2 |
| EMPLOYMENT LOCATION: BEIJING, CHINA, LINGTONE | 2,1 |
| DRUG TESTING | 2,5 |

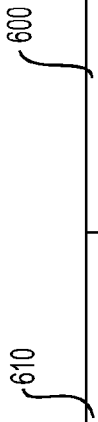

ORDER TURNAROUND TIME PREDICTIVE REPORT

REQUEST #:WE-123-4567

HIRE RIGHT

HIRERIGHT, DNN
5151 CALIFORNIA
IRVINE, CA 92617
PHONE: (949) 428-5910
FAX: (949) 428-5805

HIRERIGHT, INC.
5151 CALIFORNIA
IRVINE, CA 92617
PHONE:866-521-6995. 949-428-5804
FAX: 877-797-3442, 949-224-6020
CUSTOMERSERVICE@HIRERIGHT.COM

DEAR CUSTOMER:

THANK YOU FOR ORDERING VERIFICATION SERVICES FROM HIRERIGHT
YOUR ORDER WE-123-4567 WAS SUCCESSFULLY SUBMITTED AND PROCESSING HAS BEGUN.
ACCORDING TO HISTORICAL DATA, THE MEAN TURNAROUND TIME (TAT) VALUES FOR THE INDIVIDUAL
SERVICES IN THE GIVEN LOCATIONS ARE THE FOLLOWING:

| VERIFICATION | TAT |
| --- | --- |
| SS TRACE | 0,01 |
| CRIMINAL FELONY & MISDEMEANOR (PAST 7 YEARS HISTORY)<br>LOCATION: NEW YORK, NEW YORK COUNTY, NY, USA | 2,1 |
| CIVIL UPPER & LOWER (PAST 7 YEARS HISTORY)<br>LOCATION: NEW YORK, NEW YORK COUNTY, NY, USA | 1,8 |
| FEDERAL CRIMINAL (PAST 7 YEARS )<br>LOCATION: NEW YORK, NEW YORK COUNTY, NY, USA | 2,2 |
| FEDERAL BANKRUPTCY<br>LOCATION: NEW YORK, NEW YORK COUNTY, NY, USA | 1,5 |
| EDUCATION<br>LOCATION: BOSTON, MA, USA, NORTHEASTERN UNIVERSITY | 1,8 |
| EDUCATION<br>LOCATION: DELHI, INDIA, UNIVERSITY OF DELHI | 3,2 |
| EMPLOYMENT<br>LOCATION: BEIJING, CHINA, LINGTONE | 2,1 |
| DRUG TESTING | 2,5 |

FIG. 9A

METHOD AND APPARATUS FOR THE PREDICTION OF ORDER TURNAROUND TIME IN AN INFORMATION VERIFICATION SYSTEM

RELATED APPLICATIONS

The present patent application claims priority to the provisional patent application entitled "Method, statistical model and apparatus used for prediction of order turnaround time in an information verification system," filed on Jun. 25, 2007, and assigned Ser. No. 60/937,053. The present invention relates generally to methods, statistical models and apparatus used for the prediction of order turnaround time in information verification systems.

BACKGROUND OF THE INVENTION

Information verification systems process information verification orders consisting of several and diverse instances of different types of elementary verification/validation/search services, each of which is characterized by its own turnaround time (TAT) statistical distribution function. The entire order is completed and can be delivered to a customer only when the latest verification service in the order is completed.

Known approaches for predicting the TAT of an order are based on using constant TAT values for estimating the completion time of an order. However, actual turnaround time for an instance of elementary verification service can vary depending upon a series of known and chaotic/unknown factors. For example, a specific education verification can be completed from between 1 hour and 10 or more days depending on the workload of the verifier, the availability of all necessary data, the accessibility of the content provider (school) and its specific legal requirements, and other circumstances. Therefore use of constant TAT values does not reflect what is really happening in the real world and often does not coincide at all with the order TAT values that occur in reality.

This discrepancy requires using a more adequate statistical approach for TAT evaluation to provide the end user of the information verification system with the relevant statistical forecast about when the given information verification order will be completed.

SUMMARY OF THE INVENTION

The method and apparatus for the prediction of order turnaround time in an information verification system in accordance with the invention provides for the use of TAT statistical distribution functions for each elementary verification service.

The method and apparatus of the invention further continuously updates the TAT statistical distribution functions of each elementary verification service by utilizing historical data available in the information verification system. The TAT statistical distribution functions depend upon factors including: the type of elementary verification service; the location(s) associated with the elementary verification service; and the content provider(s) used in the delivery of the elementary verification service.

In accordance with one aspect of the invention, when an order is submitted, the types and number of elementary verification services, as well as their location(s) (if any) and content providers are determined. Based on this information, corresponding distribution functions for each of the elementary verification services contained in the order are identified.

In accordance with another aspect of the invention, a predictive model allows construction of the TAT distribution function for the entire order and calculates statistical parameters of the order such as mean value, median value, and confidence intervals for the most popular percentile levels (75%, 90%, 95%) before order processing is started.

In accordance with another aspect of the invention, results of the predictive model are provided to end users as indicators of when the order will be completed.

In accordance with another aspect of the invention, an apparatus operable to create, maintain and update the statistical distributions associated with the elementary verification services provides the predictive statistical model that produces more accurate results over time.

There has been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended herein.

In this respect, before explaining at least one embodiment of the invention in detail, it is to be understood that the invention is not limited in its application to the details of design and to the sequence of steps set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other methods and systems for carrying out the several purposes of the present invention. It is important, therefore, that the claims be regarded as including such equivalent methods and systems insofar as they do not depart from the spirit and scope of the present invention.

BRIEF DESCRIPTION OF THE DRAWINGS

The present disclosure may be better understood and its numerous features and advantages made apparent to those skilled in the art by referencing the accompanying drawings (and illustrations). The drawings illustrate the methods, statistical models and apparatus of the present invention by providing an example of the integrated solution with one specific type of systems supporting specific business processes.

FIG. 5 is an illustration of statistical parameters of the information verification order in accordance with the invention;

FIG. 6 is an illustration of the convergence of the Monte-Carlo algorithm in accordance with the invention;

FIGS. 9A and 9B are in illustrative example of how the results of predictive TAT calculations for an information verification order could be presented to a user at the time the order is place. The statistical modeling shown in FIG. 9b shows that the entire order WO-123-4567 is expected to be completed in 3.5 days based on the mean value. This estimate is greatly affected by the Education Verification in Delhi, India, University of Delhi. The actual TAT value of the order may differ due to statistical fluctuations in orders of this type. The TAT for an order of this type is characterized by the distribution function with the form shown in FIG. 9B;

DETAILED DESCRIPTION OF THE INVENTION

DESCRIPTION OF THE STATISTICAL MODEL: The model provides an estimate of the turnaround time of an information verification order.

Figures 1, 2:
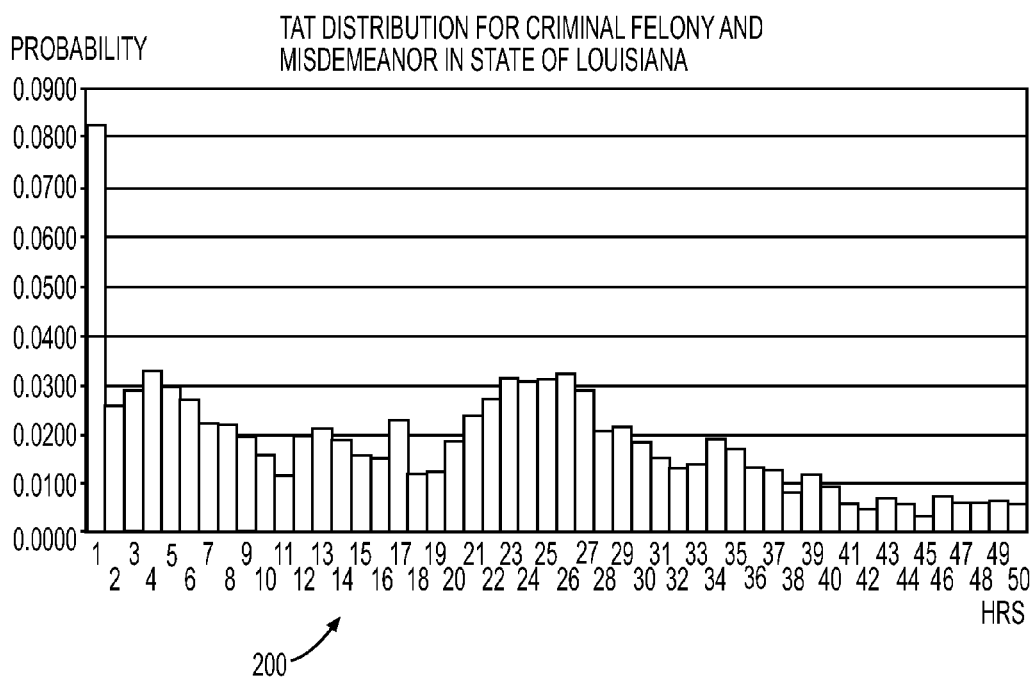
FIG. 1 is an illustration of the structure of an information verification order in accordance with the invention.
FIG. 2 is an illustration of a TAT distribution histogram of an exemplary elementary verification service in accordance with the invention.

An information verification order 100 consists of N elementary verification services (N>1) 110 as shown in FIG. 1. Elementary verification services 110 include many different types including employment, education and criminal history. Different types of elementary verification services 110 may be processed independently and according to elementary verification service specific workflows. Moreover, even different instances of elementary verification services of the same type can be processed independently (or at least they are weakly correlated). Alternatively, they can be assigned to different vendors/providers or mapped to different locations.

The TAT values 120 for instances of elementary verification services 110 can vary in a wide range. The range depends upon a set of reasons of both a regular and a chaotic nature. Some examples of regular reasons that determine the TAT range of values include: 1) is there any automatic treatment in place for the elementary verification service? In this case the whole process from submission to closure takes a couple of minutes; 2) waiting for the creation of a batch before sending requests to a provider (e.g. a criminal vendor); 3) waiting for the next business day while an elementary verification service is processed by a vendor (e.g. criminal court searches performed by court runners); and 4) amount of elementary verification service instances in a queue of tasks for an operator.

Some examples of chaotic reasons that influence the TAT range of values include: 1) delay in getting answers from a provider (e.g. school or employer) due to random reasons (e.g. holiday, weather, wrong phone number, etc.); 2) the elementary verification service instance does not pass quality control and it is returned back to the queue; 3) the fulfillment of the elementary verification service instance requires sending/receiving additional legal documents; 4) the elementary verification service instance is re-assigned to a different vendor or operator; and 5) technical problems with communications (phone, fax, email, etc.).

Thus, the TAT value for each elementary verification service in the information verification order is not a constant; rather this is a random variable that more accurately may be described by a distribution law. FIG. 2 shows a typical distribution 200 of TAT values for a Criminal Felony & Misdemeanor verification service in the state of Louisiana.

Each instance of an elementary information verification service in an order can be described by a distribution function and the distribution function can be constructed from the historical data for a previous period. As a result, for any information verification order, if the TAT distributions for all the instances of the elementary verification services comprising the order are available, then the TAT distribution for the entire information verification order can be determined.

Figure 3:
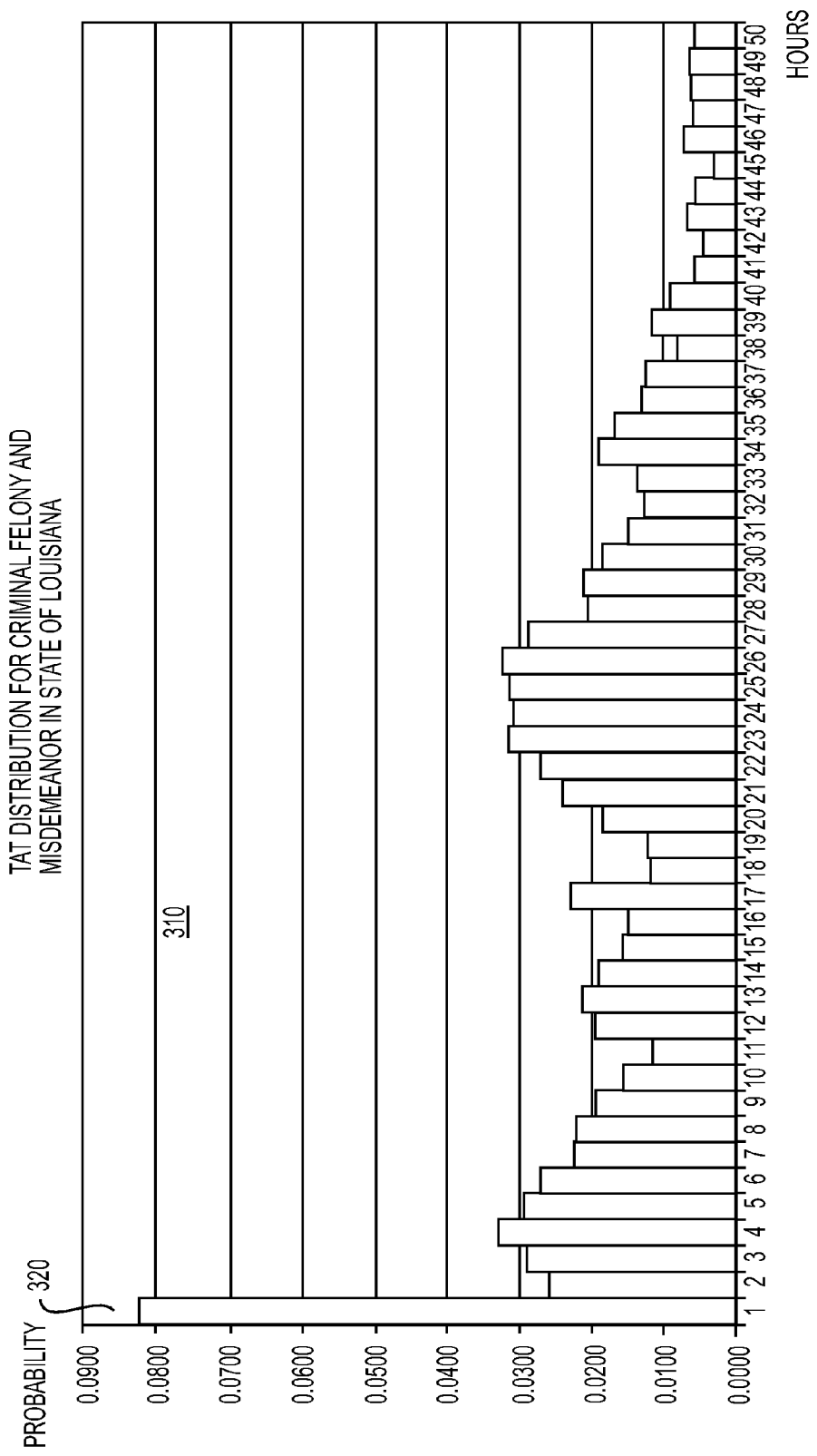
FIG. 3 is an illustration of random points generated by the Monte-Carlo algorithm in accordance with the invention.

In accordance with the invention, this determination is made using the Monte Carlo method (see http://en.wikipedia.org/wiki/Monte_Carlo_method for a brief description of the method). It is assumed that TAT values are a discrete random variable, and each instance of an elementary verification service in an information verification order is characterized by a known distribution function (histogram). Considering the first instance of an elementary verification service in the information verification order and its TAT distribution histogram, a rectangle 300 (FIG. 3) circumscribing the histogram is constructed. Any height and width of the rectangle 300 can be used as this does not influence the computation results. According to the Monte Carlo method, points 310 are randomly generated filling in the rectangle 300.

The random points 300 will be uniformly distributed over the rectangle 300, so their number falling within a bar 320 will be proportional to the area of the bar 320. Since the width is the same for each bar 320 (equal to the time resolution—for example, 1 hour), the number of points falling within a bar 320 is statistically proportional to the height of the bar 320. Each random point 310 falling inside the histogram corresponds to the event when the service is completed for the TAT value equal to x. Using the Monte Carlo method, thousands of "virtual" services of the given type are simulated during a minute, so that they will be distributed by TAT value strictly according to the real experimental distribution for the service (with some statistical fluctuations depending on the number of the points 310).

The algorithm for an information verification order of N elementary verification services in accordance with the invention is as follows. First a point for the first elementary verification service in the information verification order is drawn. If the point falls outside the histogram, it is ignored and a second point is drawn. This yields a TAT value $x_1$ for the first elementary verification service. Then a point for the second elementary verification service is drawn and the TAT value $x_2$ for the second service is determined. The drawing is continued until all N elementary verification services are simulated. The TAT value X for the entire information verification order is defined as $$X=\max(x_1,x_2,\ldots,x_n),$$

where $x_1, x_2, \ldots, x_n$ are the TAT values of the instances of the elementary verification services $1, 2, \ldots, N$ in the information verification order.

Figure 4:
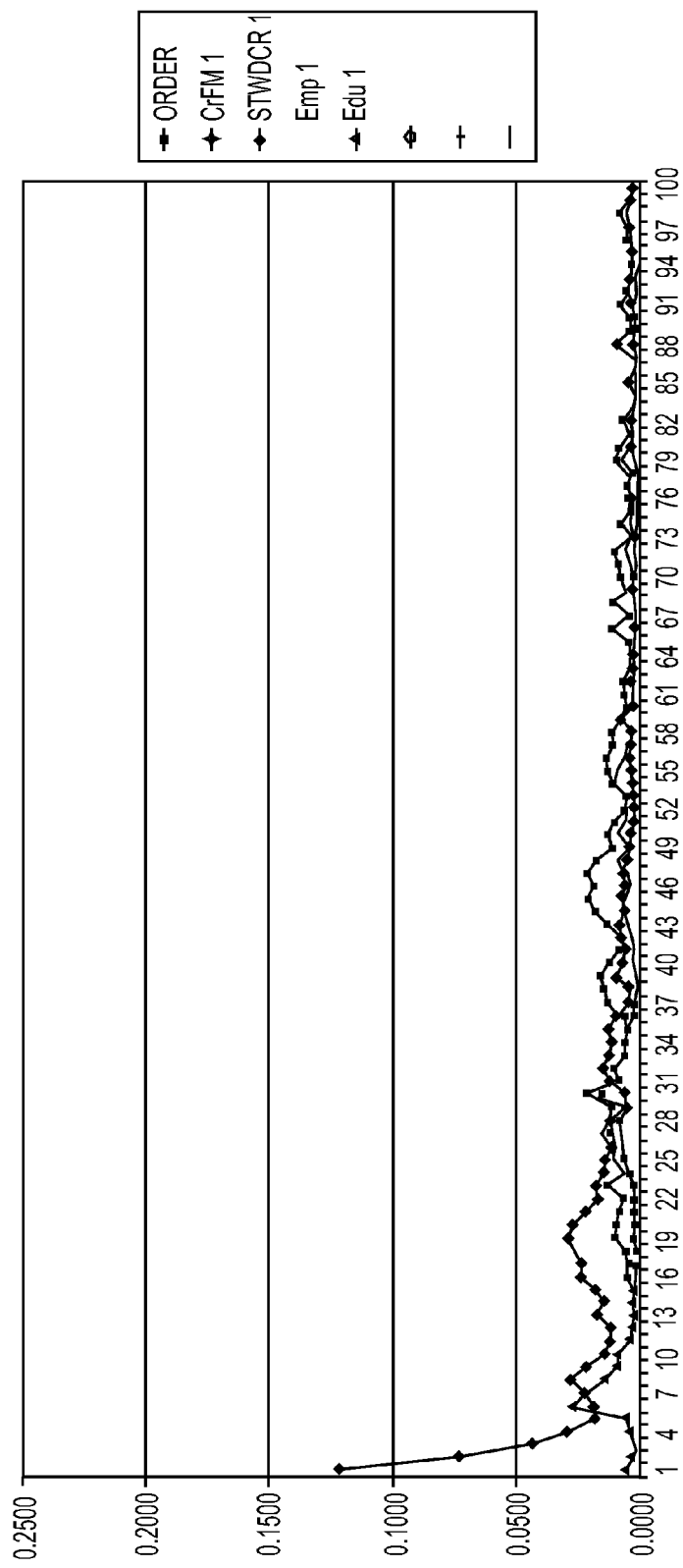
FIG. 4 is an illustration of the TAT distribution functions for elementary verification services and for the whole order simulated by Monte Carlo algorithm in accordance with the invention.

Thus the TAT distributions for each elementary verification service and for the entire information verification order are simulated as shown in FIG. 4. It takes less than a minute to draw 10,000 points and predict the resulting TAT value for the complete information verification order with the necessary accuracy. Knowing the distribution law allows for the definition of all statistical parameters such as the mean TAT value 500, the median TAT value 510, and confidence intervals for the most popular percentile levels (75%, 90%, 95%) 520, 530 and 540 respectively.

Convergence of the Monte Carlo algorithm is illustrated in FIG. 6, wherein the resulting TAT mean value 600 for an information verification order is shown dependant upon the number of points 610 generated. As seen, using 10,000 calculation points can ensure an error $\sigma_S$ of less than 1%. This error ($\sigma_S$) evaluated is caused by statistical fluctuations of the Monte Carlo algorithm, which ensures convergence with a rate of $1/n^{(1/2)}$, where n is the number of points to be drawn.

A second kind of errors $\sigma_T$ depends on the time resolution applied to the TAT distribution. The average value of the error $\sigma_T$ is estimated as follows: Taking the mean TAT value over all elementary information verification services to be about 2.5 days=60 hours and the time resolution to be +0.5 hours; Hence, $$\sigma_r = 0.5/60 = 0.0083 = 0.83\% \approx 1\%.$$

Thus, the resulting error under conditions assumed in the model is evaluated as follows:

$$\sigma = \sqrt{\sigma_r^2 + \sigma_S^2} = \sqrt{1+1} = 1.4\% < 2\%.$$

Figure 7:
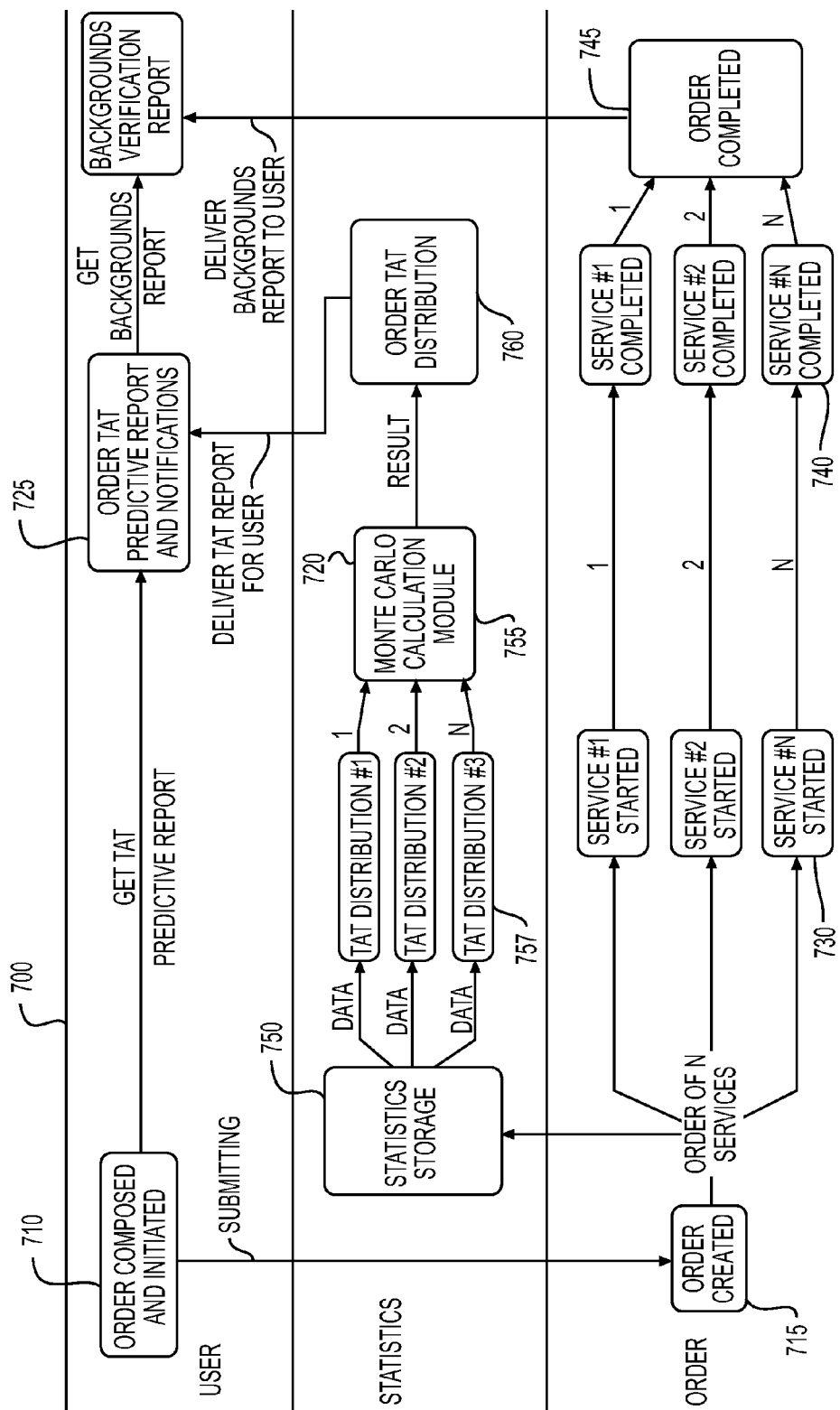
FIG. 7 is a process flow chart illustrating the overall process of creating and executing an order, calculating TAT and delivery of the reports to the user in accordance with the invention.

METHOD DESCRIPTION: A method 700 (FIG. 7) in accordance with the invention is initiated by a user of the information verification system who specifies the content of the information verification order in terms of the types of elementary verification services to be verified and inputs all necessary data in a step 710. When the order is created in the information verification system, the order is divided into elementary verification services (1, 2, . . . N), and each elementary verification service is treated with its own workflow.

The order is created in a step 715 and immediately thereafter, statistical processing to predict the TAT for the order is commenced in a step 720 in which a Monte Carlo calculation module 755 is employed to determine an order TAT predictive report 760 from stored statistics for each elementary verification service 757. A statistics storage device 750 maintains TAT values for previously completed elementary services instances (e.g. for a period of 3 months). The order TAT predictive report is delivered to the user in a step 725. Concurrently, the elementary verification services (1, 2, . . . N) are started in a step 730 and completed in a step 740. The information verification order is completed and delivered to the user in a step 745.

The TAT values are maintained and organized based upon relevant organizational criteria. As an example, the storage is organized hierarchically by targeting different geographical scales. For any elementary verification service depending on location, its specific TAT distribution can be derived for country, state/province, county/region, and city.

A hierarchical level is considered acceptable if the data volume is equal to or exceeds 100 points. The system automatically selects the minimum acceptable level by scanning statistical data from the lower level (city) to the upper level (country). For example, a criminal felony check is ordered in USA, California state, Santa Barbara county. In the statistical storage device 750, less than 100 records for this service in the Santa Barbara county are maintained. Therefore the TAT distribution for the entire California state is used when processing this criminal check in the county (assuming that the TAT distribution on the state level has enough points).

In addition to geographical scaling, specific TAT distributions for major employers and educational institutions can be used. The same condition (n>=100, where n is number of points) is used for transitions between the hierarchical levels. For example, between 30 and 50 employers and between 50 and 100 universities in the 3-month statistical database may meet the n>=100 condition. Thus, the TAT distribution for a specific university is used when processing education verification services, if the university instance has enough statistical data. Otherwise more general distributions for the corresponding geographical area where the university is situated are used.

Figure 8:
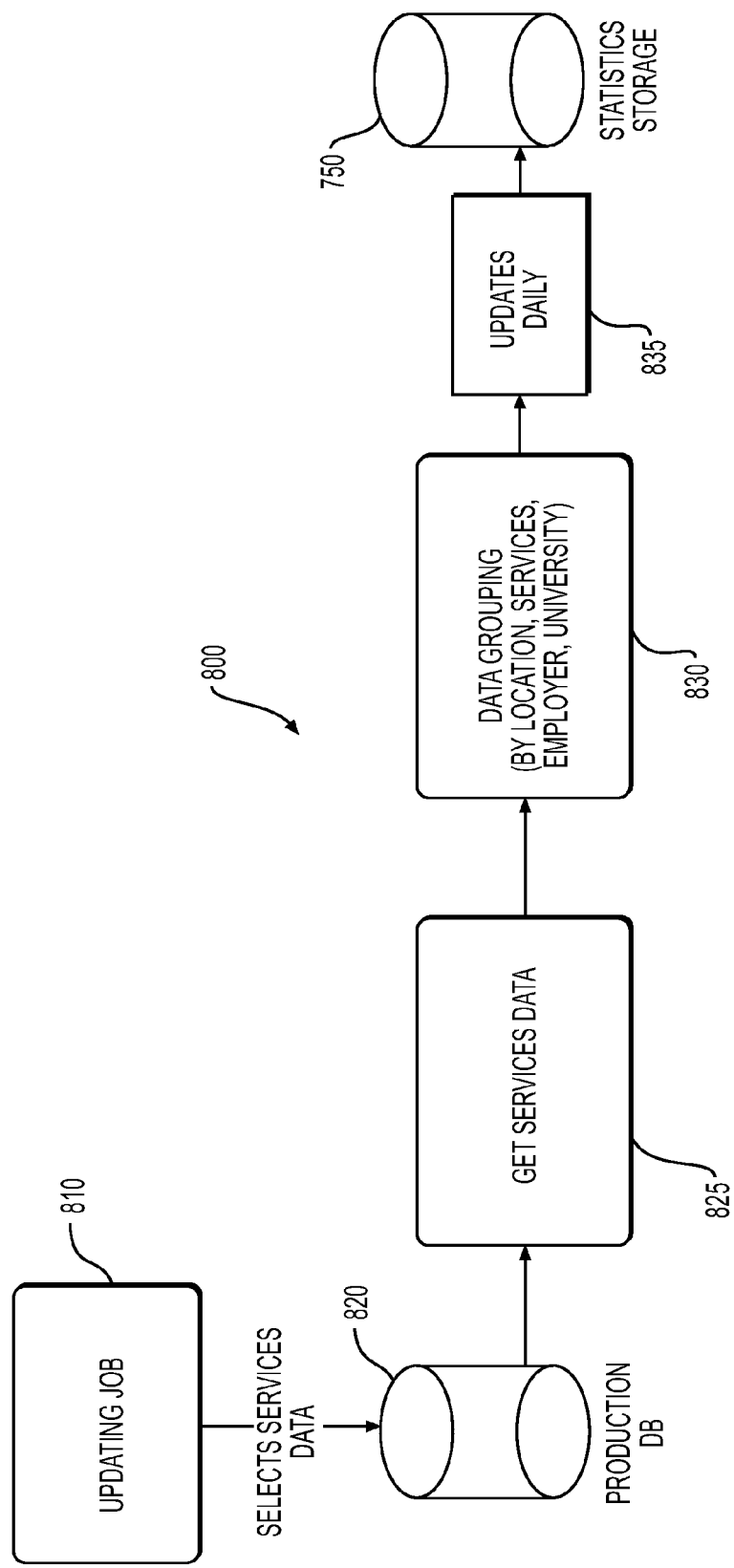
FIG. 8 is a process flow chart illustrating the process of updating the statistical distributions of the elementary verification services on a continuous basis in accordance with the invention.

The TAT values stored in the statistics storage device are updated on a daily basis using an automated process 800 (FIG. 8). In a step 810 the update process is initiated and elementary verification service data stored in a production database 820 is retrieved in a step 825. In a step 830, the retrieved data is grouped (by location, services, employer, university) and in a step 835, the retrieved data is stored in the statistics storage device 750. In this manner the statistics storage device always contains data for the last 90 days (assuming that the timeframe is set to 3 months).

Figure 9B:
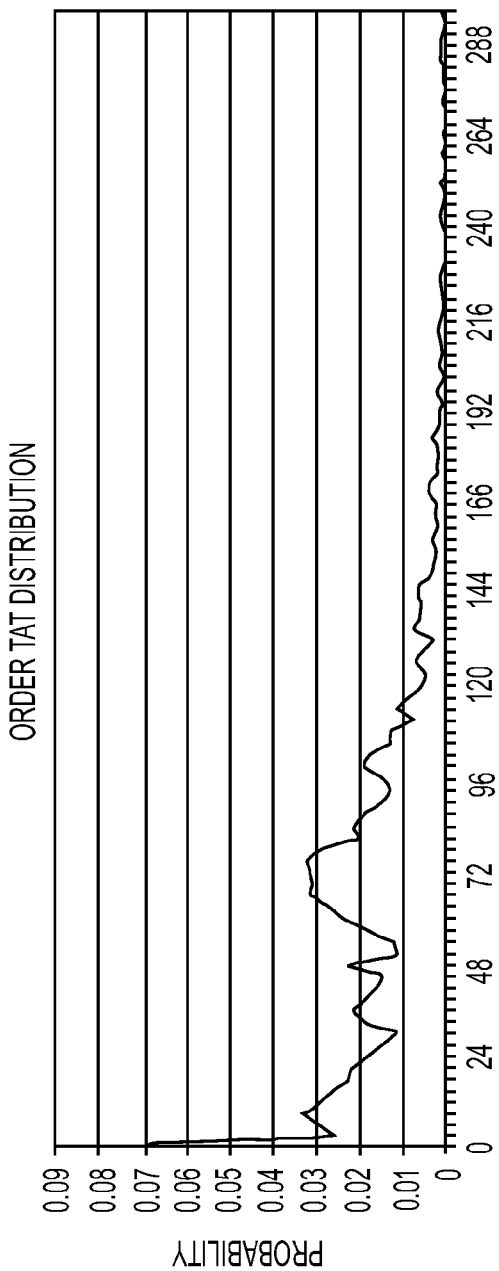

When the correct set of TAT distributions is extracted from the statistics storage device 750 based upon the content of the information verification order, the Monte Carlo calculation module 720 computes the resulting distribution for the whole order. Using the outputs of the Monte Carlos calculation module 720, the results can be delivered to the user as part of the final report. The order TAT predictive report is available to the user immediately after the order processing is started (the delay is determined by the calculation time only and takes on the order of several minutes). An example of an Order TAT Predictive Report 900 in html format is shown in FIGS. 9A and 9B.

Figure 10:
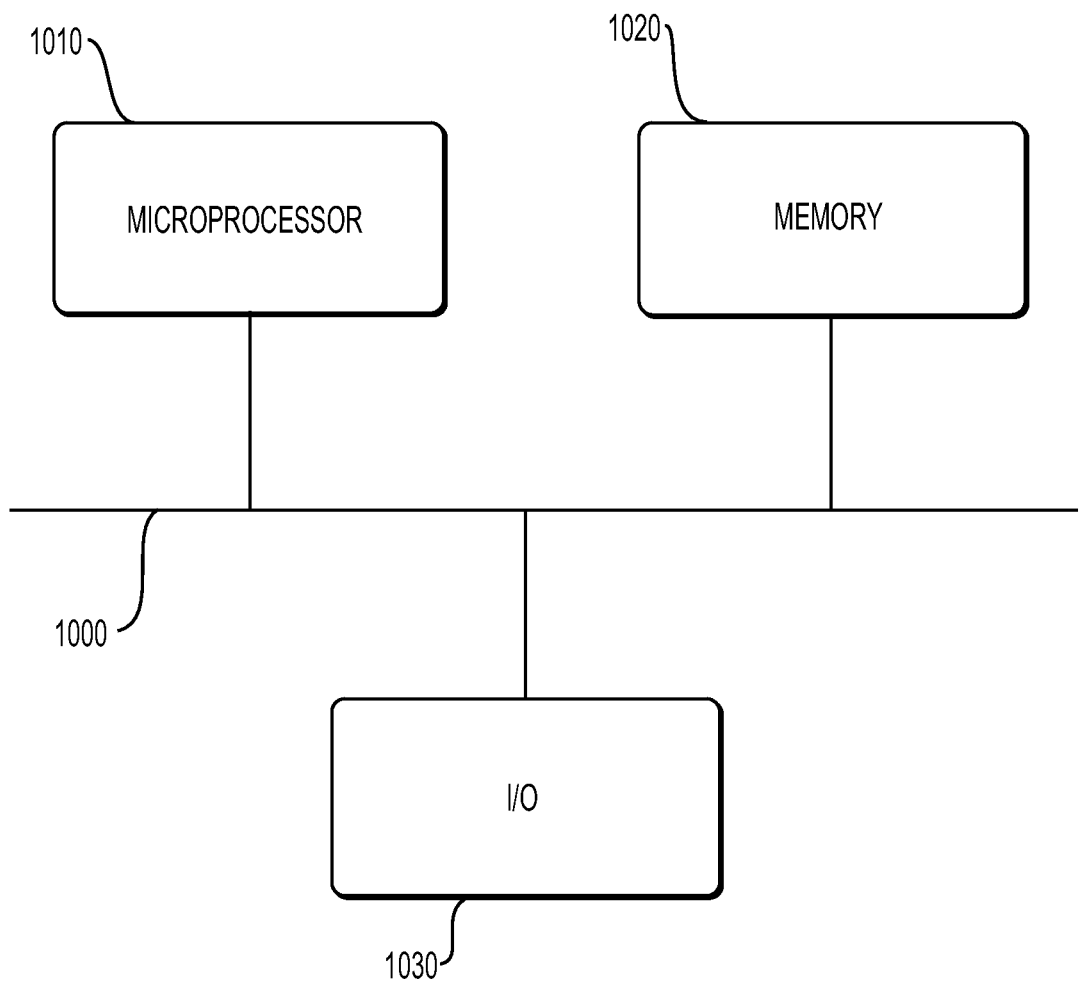
FIG. 10 is an illustration of an apparatus operable to execute the process of FIG. 7.

APPARATUS DESCRIPTION: An apparatus 1000 (FIG. 10) is operable to execute the steps of the described processes 700 and 800. The apparatus 1000 is a computing device comprising a microprocessor 1010, a memory device 1020, and input/output modules 1030 as is well known in the art. The apparatus 1000 is operable to execute a computer program implementing processes 700 and 800.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A method for preparation of an order turnaround time predictive report for a background information verification order in an information verification system, each such information verification order associated with an individual whose background information is to be verified through one or more elementary verification services, the information verification system comprising a processor, one or more statistics storage devices, one or more calculation modules, and one or more input/output modules, the method comprising the steps of:

receiving from a user via the input/output module one or more elementary verification services to be processed, wherein each such elementary verification service comprises one or more items of the individual's background information to be verified;

creating an information verification order within the information verification system, wherein the information verification order comprises one or more of the received elementary verification services to be processed, via said processor;

identifying at least one turnaround time statistical distribution function associated with each such elementary verification service via the calculation module, wherein such turnaround time statistical distribution function is based on one or more statistics of each such elementary verification service within at least one of said statistics storage devices, and wherein each such statistic represents the actual processing time for the past performance of an elementary verification service; and preparing the predicted order turnaround time predictive report of the information verification order based upon the turnaround time statistical distribution function associated with each such elementary verification service via at least one of the calculation module and the processor.

2. The method of claim 1, wherein at least one of the one or more calculation modules is a Monte Carlo calculation module, and wherein the step of identifying the turnaround time statistical distribution function associated with each elementary verification service comprises applying a Monte Carlo algorithm to the stored turnaround time statistics of each such elementary verification service.

3. The method of claim 1, further comprising updating the stored statistics within the statistics storage device automatically on a periodic basis.

4. The method of claim 1, wherein the stored statistics are maintained within the statistics storage device hierarchically.

5. The method of claim 4, wherein the hierarchy is geographical.

6. The method of claim 4, wherein the hierarchy is institutional.

7. The method of claim 1, wherein the stored turnaround time statistics include at least 100 data points for at least one verification service.

8. An apparatus for preparing an order turnaround time predictive report in a background information verification system comprising:

one or more input/output modules configured to receive a background information verification order from a user, the background information verification order including at least one elementary verification service comprising one or more items of background information to be verified;

a processor, the processor operable to receive a background information verification order from an input/output module, and operable to process each elementary verification service;

one or more statistics storage devices configured to store turnaround time statistics relating to at least one of said elementary verification services; and one or more calculation modules configured to identify at least one turnaround time-statistical distribution function associated with each such elementary verification service based on one or more turnaround time statistics of such elementary verification service stored within at least one of said statistics storage devices, wherein each such statistic represents the actual processing time for the past performance of an elementary verification service; and further configured to prepare the predicted order turnaround time predictive report of the information verification order based upon the turnaround time statistical function associated with each such verification service.

9. The apparatus of claim 8, wherein the calculation module is operable to apply a Monte Carlo algorithm to the stored statistics of an elementary verification service to determine the predicted order turnaround time statistical distribution function of each such elementary verification service.

10. The apparatus of claim 8, wherein the processor is operable to update the stored statistics automatically on a periodic basis based on one or more actual processing times of one or more elementary verification services.

11. The apparatus of claim 8, wherein the statistics storage device is operable to maintain the stored statistics hierarchically.

12. The apparatus of claim 11, wherein the hierarchy is geographical.

13. The apparatus of claim 11, wherein the hierarchy is institutional.

14. The apparatus of claim 8, wherein the stored statistics related to the at least one verification service include at least 100 data points.

15. The method of claim 1, wherein at least one elementary verification service is selected from the group consisting of a criminal felony and misdemeanor verification service; an education verification service; a statewide criminal search service; an employment search service; a civil upper and lower service; a federal criminal service; a federal bankruptcy service; and a drug testing service.

16. The method of claim 1, wherein the processing time of an elementary verification service is based on the amount of time required for the occurrence of:

electronically communicating a request to verify the background information of each elementary verification service to a content provider;

waiting for a content provider to verify the background information and provide a response to the request; and quality control checking the response.

17. The method of claim 16, wherein the processing time of an elementary verification service is further based on the amount of time required for the occurrence of determining the location of the elementary verification service.

18. The method of claim 16, wherein the processing time of an elementary verification service is further based on the amount of time required for the occurrence of sending additional legal documents to the content provider.

19. The method of claim 4, wherein the identifying of at least one turnaround time statistical distribution function associated with each such elementary verification service can be based on a subset of the one or more turnaround time statistics stored within at least one of said statistics storage devices.

20. The method of claim 19, wherein the subset of turnaround time statistics represents turnaround statistics associated with a geographical region.

21. The method of claim 19, wherein the subset of turnaround time statistics represents turnaround statistics associated with a specific employer.

22. The method of claim 19, wherein the subset of turnaround time statistics represents turnaround statistics associated with an educational institution.

23. The method of claim 19, wherein the subset of turnaround time statistics is automatically increased to include at least 100 data points for at least one elementary verification service.

24. The method of claim 1, wherein the turnaround time statistics within the storage device are updated automatically on a periodic basis based on one or more actual processing times of one or more elementary verification services.

25. The method of claim 1, further comprising the step of calculating at least one of a mean value, median value or confidence interval associated with the predicted order turnaround time of the information verification order via the calculation module.

* * * * *